United States Patent
Ledergerber et al.

[15] 3,686,986
[45] Aug. 29, 1972

[54] MULTIPLE SPINDLE MACHINE TOOL WITH HYDRODYNAMIC BEARINGS FOR WORK SPINDLES

[72] Inventors: Alfred Ledergerber; Hans Jacoby; Gerd Fengler, all of Bielefeld, Germany

[73] Assignee: Werkzeugmaschinenfabrik Gildemeister & Comp. Aktiengesellschaft, Bielefeld, Germany

[22] Filed: Jan. 22, 1970

[21] Appl. No.: 4,894

[30] Foreign Application Priority Data

Jan. 27, 1969 Germany ..........P 19 03 882.5

[52] U.S. Cl..................................82/30, 308/189 A
[51] Int. Cl. ............................................B23b 19/02
[58] Field of Search........82/3, 30; 308/207 A, 189 A

[56] References Cited

UNITED STATES PATENTS

| | | |
|---|---|---|
| 3,103,838 | 9/1963 | Beacon et al..................82/28 |
| 3,211,060 | 10/1965 | McCann.................308/207 A |
| 2,653,062 | 9/1953 | Sperisen...............308/DIG. 4 |
| 150,561 | 5/1874 | Garton..................308/DIG. 4 |

Primary Examiner—Leonidas Vlachos
Attorney—Michael S. Striker

[57] ABSTRACT

A multiple spindle automatic tool wherein an indexible carrier for the work spindles accommodates pairs of sliding type bearings for the spindles and adjustable springs which bias the inner races of the bearings against the respective spindles. The bias of the springs can be counteracted by a hydraulic control system which can reduce the pressure between selected inner races and the respective spindles.

15 Claims, 7 Drawing Figures

Inventor:
Alfred Ledergerber
Hans Jacoby
Gerd Fengler their Attorney

Inventor:
Alfred Ledergerber
Hans Jacoby
Gerd Fengler their Attorney

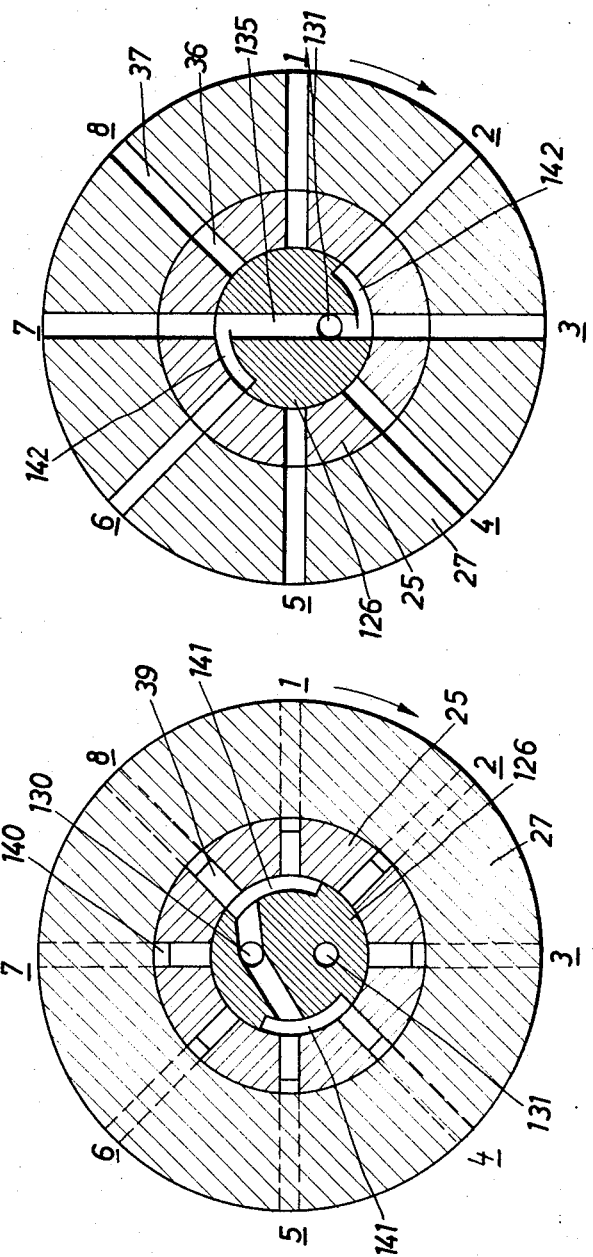

MULTIPLE SPINDLE MACHINE TOOL WITH HYDRODYNAMIC BEARINGS FOR WORK SPINDLES

BACKGROUND OF THE INVENTION

The present invention relates to improvements in multiple spindle machine tools, and more particularly to improvements in bearings for work spindles in the spindle carrier of a multiple spindle automatic.

In presently known multiple spindle automatic machine tools, the work spindles are mounted in roller bearings which are installed in the indexible spindle carrier. The static rigidity of bearings in axial and radial directions of the spindles can be enhanced by biasing the bearings against the adjoining portions of the spindles. However, such mode of mounting the bearings can enhance the static rigidity only to a certain extent, namely, depending on the wear upon the bearings, the precision of finish and the amount of heat generation. Another drawback of presently known bearings for work spindles is their limited ability to bring about a damping action. For example, conventional bearings cannot satisfactorily damp vibrations which develop during material removal from workpieces. Since the metallic parts of roller bearings are in direct contact with the spindles, vibrations of the machine frame are transmitted to spindles and hence to the workpieces. This affects the closeness of tolerances.

On the other hand, the static and dynamic stresses upon the bearings for work spindles in modern multiple spindle automatic machines are often very high because it is customary to simultaneously treat several workpieces in order to reduce the machining time per article and to insure maximum utilization of the machine. Such machining time is further reduced if a workpiece is simultaneously treated by two or more tools which results in additional static and dynamic stressing of bearings for the work spindles. Still further, many multiple spindle machine tools utilize recent types of material removing tools which can stand elevated temperatures. For example, diamond tools or those consisting of oxide ceramics are capable of removing large quantities of material but such tools can be used with advantage only in machines wherein the work spindles and the tool holders are substantially free of vibrations.

SUMMARY OF THE INVENTION

An object of the invention is to provide novel and improved bearings for work spindles in the indexible carrier of a multiple spindle machine tool.

Another object of the invention is to provide bearings which can mount work spindles in the carrier of a multiple spindle bar or chucking machine and whose static and dynamic rigidity is superior to the rigidity of conventional bearings.

A further object of the invention is to provide novel means for lubricating the bearings for work spindles in multiple spindle machine tools.

An additional object of the invention is to provide a novel carrier for the work spindles of a multiple spindle machine tool.

Still another object of the invention is to provide a multiple spindle machine tool wherein the static and dynamic rigidity of bearings for selected work spindles or groups of tool spindles can be determined in advance and adjusted to reduce or eliminate stray movements during particular types of machining operations.

A concomitant object of the invention is to provide a multiple spindle machine tool wherein the bearings for work spindles are more reliable, more versatile and longer-lasting than in presently known machine tools but do not unduly increase the bulk of the spindle carrier.

The invention is embodied in a multiple spindle machine tool which comprises frame means, a spindle carrier which is indexible in the frame means, a plurality of parallel work spindles rotatably mounted in the carrier, and hydrodynamic bearing means of high static and dynamic rigidity for the work spindles. The bearing means comprises bearings installed in the carrier and surrounding the spindles, biasing means for urging the bearings against the respective spindles to thereby normally hold the spindles against uncontrolled axial and/or radial movements with reference to the carrier, and hydraulically operated control means for adjusting the pressure between at least some of the bearings and the respective spindles, for example, during starting when the spindles are rotated with reference to the carrier. The control means preferably includes pistons provided in the carrier and movable therein in response to admission of pressurized fluid to thereby relieve the pressure between the corresponding bearings and the spindles (i.e., to counteract the bias of the biasing means), and a distributor which can admit pressurized fluid to chambers for selected pistons.

The novel features which are considered as characteristic of the invention are set forth in particular in the appended claims. The improved machine tool itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 6 is a transverse vertical sectional view of a modified distributor; and

FIG. 7 is another transverse vertical sectional view of the modified distributor.

DESCRIPTION OF THE PREFERRED EMBODIMENTS

Figure 1:
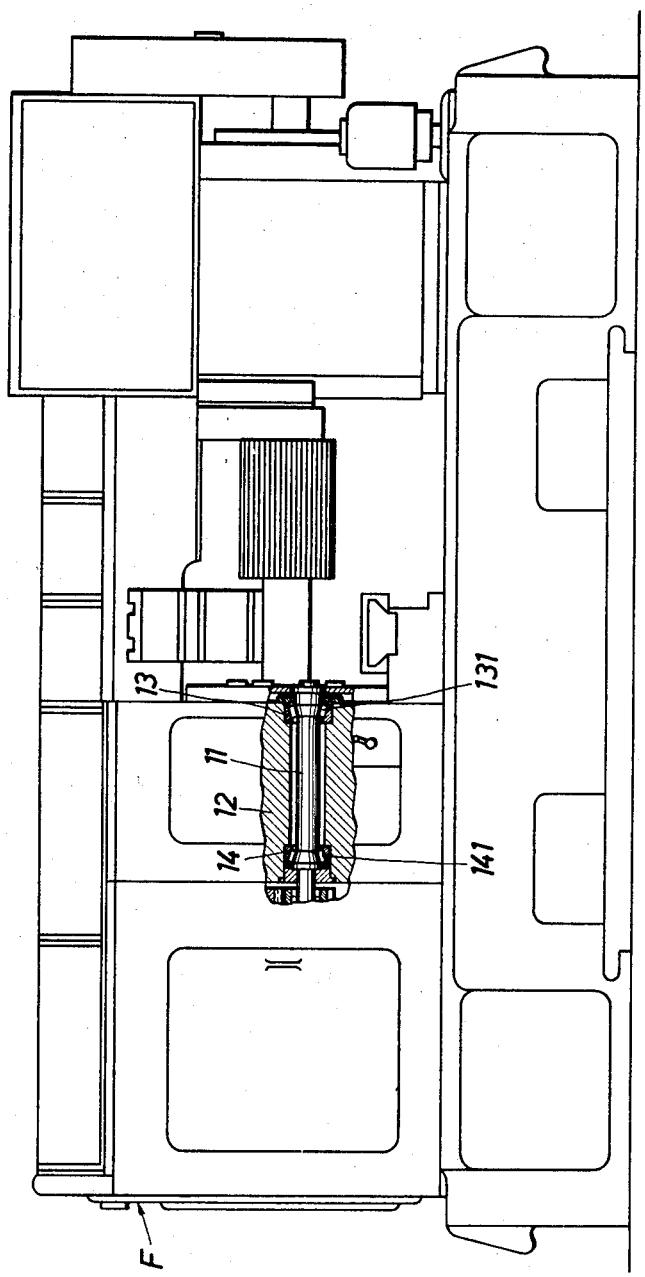
FIG. 1 is a schematic side elevational view of a multiple spindle automatic machine tool which embodies one form of the invention, a portion of the spindle carrier being shown in section.
Figure 2:
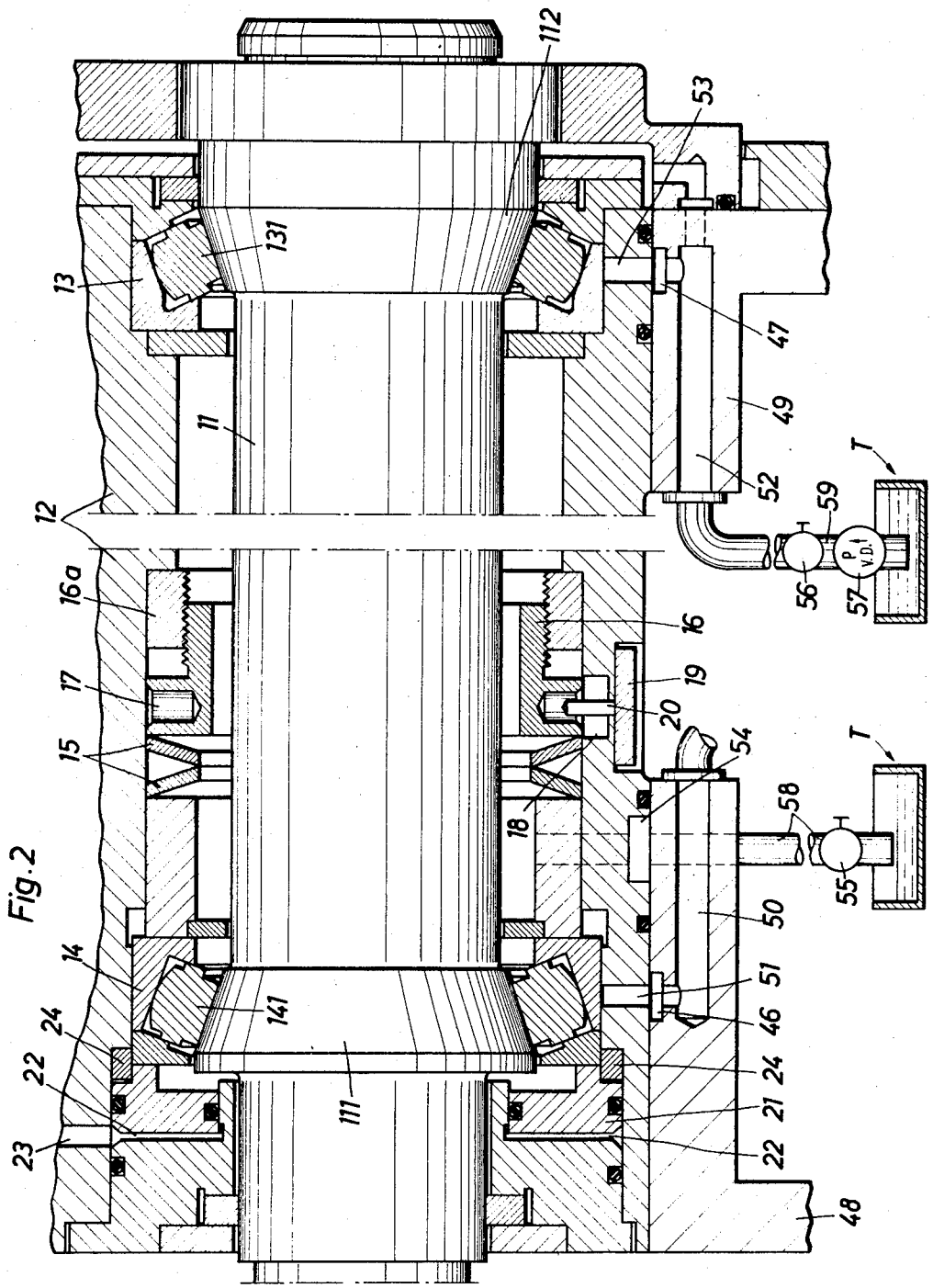
FIG. 2 is an enlarged axial sectional view of the bearing for one work spindle in the machine tool of FIG. 1.

Referring to FIG. 1, there is shown a horizontal multiple spindle automatic machine tool with eight work spindles 11 which are mounted in an indexible spindle carrier 12. In accordance with a feature of the invention, the spindles 11 are mounted in hydrodynamic bearing assemblies one of which is illustrated in FIG. 2. The front bearing of the bearing assembly shown in FIG. 2 is a sliding type bearing (also known as plain or guide bearing) comprises an outer race 13 which is mounted in the carrier 12 adjacent to the work supporting end of the spindle 11 and engages a composite inner race or shoe 131 which consists of several arcuate portions and whose conical internal surface abuts against the complementary conical external surface 112 of the spindle 11. The rear sliding type bearing of this bearing assembly comprises an outer race 14 which is movable, within limits, axially of the carrier 12 and cooperates with a composite inner race of shoe 141 which consists of several arcuate portions and has a conical internal surface abutting against the adjacent conical external surface 111 of the spindle 11. Prestressed dished springs 15 are provided to bias the outer race 14 against the inner race 141 so that the latter bears against the conical surface 111 and causes the conical surface 112 to bear against the inner race 131.

The bias of the springs 15 is adjustable by an externally threaded ring 16 which meshes with an internally threaded ring 16a fixedly mounted in the carrier 12. The ring 16 has a flange provided with a set of radially extending blind bores 17 for reception of a tool which can be used to rotate the ring 16 with reference to the ring 16a and to thereby adjust the bias of the springs 15. The spindle carrier 12 is provided with several slots 18 (one shown in FIG. 2) which afford access to the bores 17 of the respective rings 16. After the bias of the springs 15 for a particular outer race 14 is adjusted, the operator applies a cover 19 over the corresponding slot 18 and fixes such cover to the carrier 12. In order to avoid unintentional angular displacement of the ring 16, the cover 19 is provided with a projection 20 which extends into one of the bores 17.

The hydraulic control means for opposing the bias of the springs 15 and for thereby reducing the pressure between the conical surfaces 111, 112 and the respective inner races 141, 131 comprises a ring-shaped piston 21 which is movable axially in a cylinder chamber 22 of the carrier 12 and can move the inner race 141 and the outer race 14 against the opposition of springs 15 in response to admission of a pressurized hydraulic fluid into the chamber 22. This relieves the pressure between the inner races 141, 131 and the conical external surfaces 111, 112. The cylinder chamber 22 can receive fluid by way of one or more channels 23 in the carrier 12; such fluid causes the piston 21 to move into abutment with a fixedly mounted stop ring 24 in the carrier.

Figure 3:
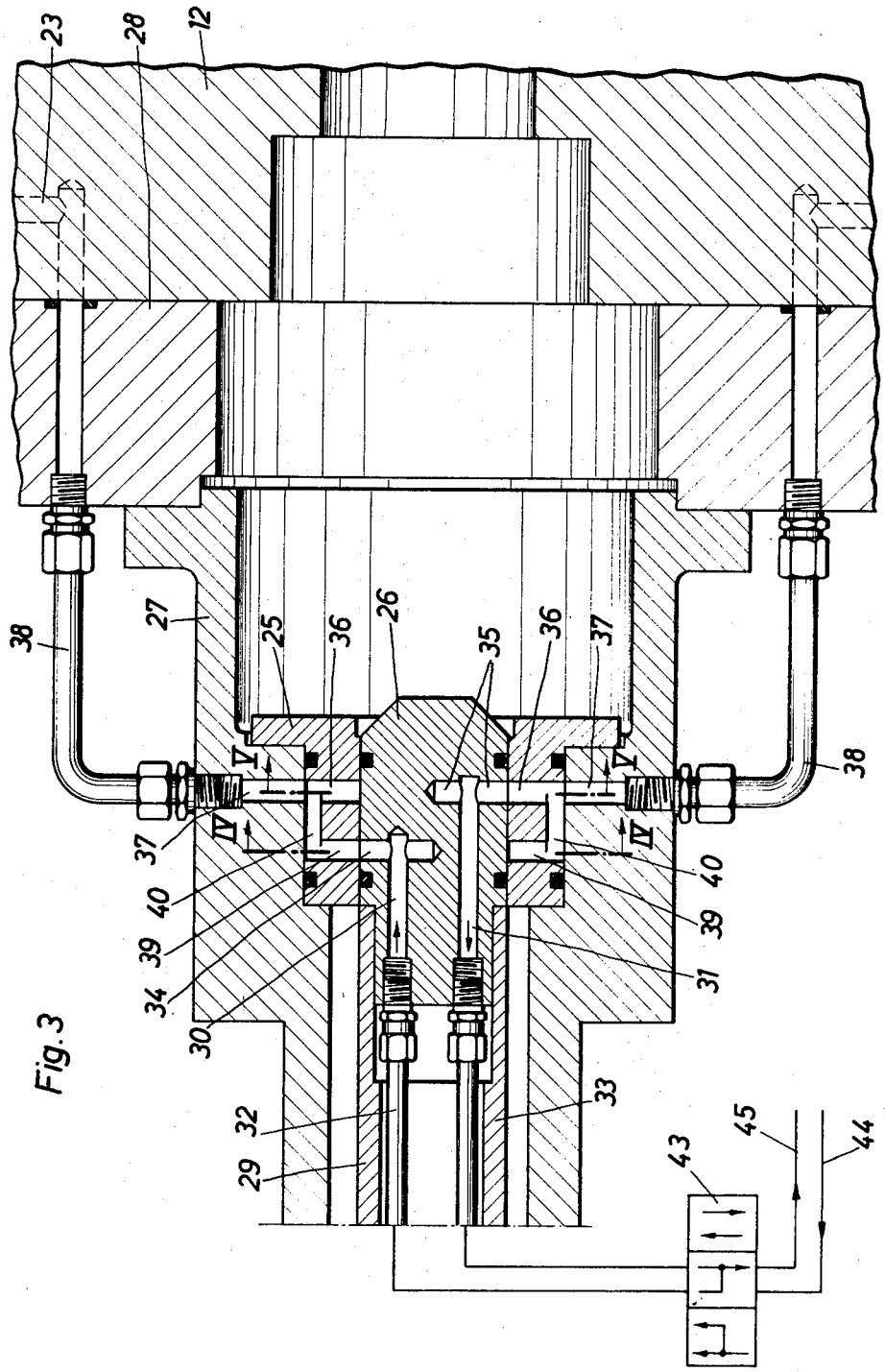
FIG. 3 is an axial sectional view of the distributor which controls the flow of hydraulic fluid to and from the bearings in the spindle carrier of FIG. 1.
Figure 4:
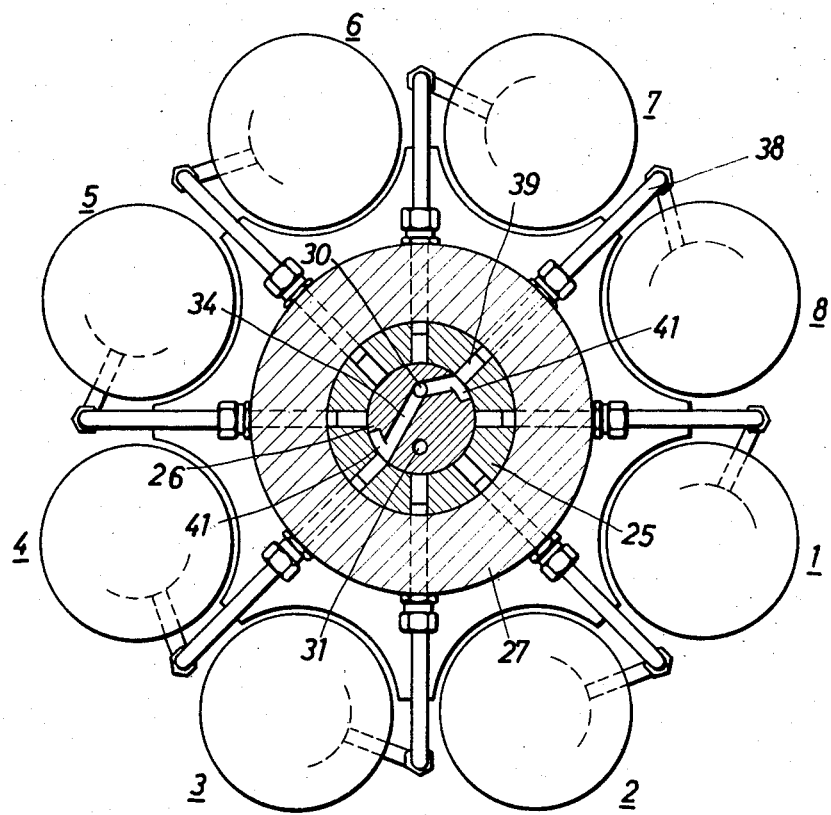
FIG. 4 is a transverse vertical sectional view as seen in the direction of arrows from the line IV—IV of FIG. 3.
Figure 5:
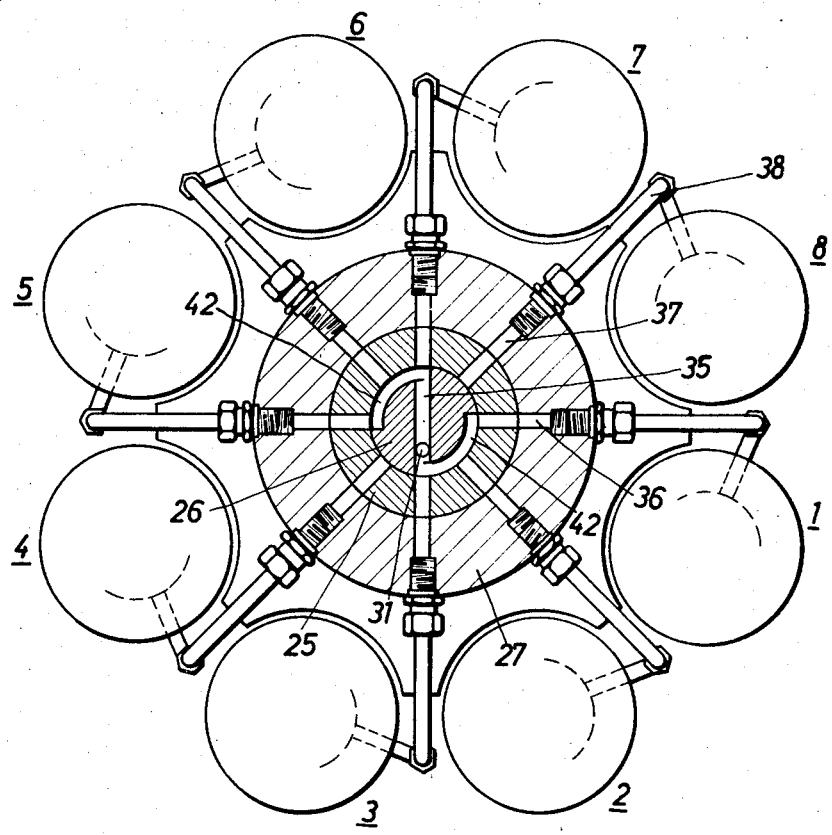
FIG. 5 is a transverse vertical sectional view as seen in the direction of arrows from the line V—V of FIG. 3.

The control means of the hydrodynamic bearing assembly further includes a distributor which serves to supply pressurized fluid to and to evacuate fluid from the cylinder chambers 22 of the carrier 12. This distributor is shown in FIGS. 3 to 5; it is mounted behind the carrier 12, i.e., remote from the chucks of the spindles 11, and comprises a cylinder 25 movable with reference to a distributor member of plunger 26. The cylinder 26 is bolted to a centrally located holder 27 which is affixed to the indexing plate or wheel 28 for the spindle carrier 12. Thus, the cylinder 25 is rigid with and is coaxially mounted on the carrier 12. The plunger 26 is secured to a tubular support 29 which is angularly movable, within limits, with reference to the frame F of the machine tool but is held against axial movement. When the carrier 12 is indexed by the wheel 28, the cylinder 25 turns with reference to the plunger 26.

The plunger 26 of the distributor is provided with two discrete axially parallel passages 30, 31 which are respectively connected with fluid conveying conduits 32, 33. The inner ends of the passages 30, 31 communicate with pairs of substantially radially extending channels 34 and 35 (see also FIGS. 4 and 5) which are located within the confines of the cylinder 25 and are located in two separate planes extending at right angles to the axis of the plunger 26. As shown in FIG. 4, the outer ends of the channels 34 communicate with relatively short circumferentially extending channels or grooves 41 machined into the periphery of the plunger 25. FIG. 5 shows that the outer ends of the channels 35 communicate with circumferentially extending channels or grooves 42 in the periphery of the plunger 26. The grooves 42 extend along angles of slightly more than 90°.

The cylinder 25 is formed with eight equidistant radially extending bores 36 which are coplanar with the channels 35 and grooves 42 of the plunger 26 (see FIG. 5.) The outer ends of the bores 36 communicate with radial bores 37 which are provided in the holder 27 and whose outer ends are connected with the respective channels 23 by means of conduits 38. The cylinder 25 is further provided with eight equidistant radially extending bores 39 which are coplanar with the channels 34 and grooves 41 (see FIG. 4) and are connected with the bores 36 by means of axially parallel grooves 40 in the periphery of the cylinder 25 (see FIG. 3).

The conduits 32, 33 are connected with a multiway valve 43 which is further connected with a supply conduit 44 for pressurized fluid and a return conduit 45 for spent fluid. The spool of the valve 43 is adjustable between several positions in the first of which it connects the supply conduit 44 with the passages 30, 31, in the second of which it connectes the passages 30, 31 with the return conduit 45, in the third of which it respectively connects the passages 30, 31 with the conduits 44, 45. In the third position of the spool in the valve 43, and assuming that the radial channels 34, 35 and circumferentially extending grooves 41, 42 in the plunger 26 are arranged in a manner as shown in FIGS. 4 and 5, the chambers 22 for the spindles 11 in working positions four and eight (FIG. 4) receive pressurized fluid from the supply conduit 44 and passage 30 so that the antifriction bearings of these spindles are relieved (the fluid opposes the bias of the respective springs 15). The return conduit 45 communicates with the passage 31 and chambers 22 for the spindles 11 in the working positions one to three and five to seven (FIG. 5), i.e., the corresponding springs 15 are free to bias the inner races 141, 131 against the external surfaces 111, 112 of the respective spindles 11.

FIGS. 6 and 7 illustrate a modified distributor wherein all such parts which are clearly analogous to or identical to the parts of the distributor shown in FIGS. 3–5 are denoted by similar characters. The sections of FIGS. 6 and 7 respectively correspond to the sections shown in FIGS. 4 and 5. As shown in FIG. 6, the circumferentially extending channels or grooves 141 of the distributor member of plunger 126 are of such length that they connect two adjoining radial bores 39 of the cylinder 25 in each angular position of the spindle carrier, i.e., in each angular position of the holder 27. The circumferential length of the channels or grooves 142 shown in FIG. 7 is such that each thereof connects only two (instead of three) adjacent radial bores 36 in the cylinder 25 in each angular position of the spindle carrier. When the passages 130, 131 are respectively connected with the conduits 44, 45 (in the third position of the spool in the valve 43), the chambers 22 for the spindles 11 in the working positions one, four, five and eight (FIG. 6) receive pressurized fluid to reduce the pressure between the inner races 141, 131 and the respective spindle surfaces 111, 112. The chambers 22 for the spindles 11 in working positions two, three, six and seven (FIG. 7) are connected with the return conduit 45 and the corresponding inner races are biased against the spindles with the full force of associated springs 15. The axially parallel grooves or channels of the plunger 126 are shown in FIG. 6, as at 140.

The difference between the distributors of FIGS. 3–5 and 6–7 is merely that the second distributor comprises a modified plunger 126. Thus, by the simple expedient of replacing the plunger 26 with the plunger 126, or with a further plunger with a different distribution and orientation of channels therein, the operator can select the number and the positions of those spindles whose bearings are to be subjected only to the bias of springs 15 or wherein the bias of springs 15 is to be counteracted by pressurized fluid in the respective chambers 22. This enables the operator to insure that the force with which a given spindle or a given group of spindles is held against axial and/or other movement with reference to the carrier 12 can be selected in dependency on the nature of the operation which is to be performed in the machine tool.

If the nature of the contemplated operation of the machine tool is such that all of the spindles 11 are to be rotated with reference to the carrier 12 (e.g., during setting up and/or during starting), the spool of the valve 43 is moved to the first position so hat the channels 30, 31 or 130, 131 are connected with the supply conduit 44. This allows all of the cylinder chambers 22 to communicate with the source of pressurized fluid and the clamping force on all of the spindles 11 is reduced.

An important advantage of the improved machine tool is that the hydrodynamic bearing assemblies for the work spindles 11 permit for a greater variety of operations which can be performed on the workpiece. Thus, the treatment of each workpiece can be completed in fewer steps and the machine tool can hold closer tolerances even if the slides (shown in FIG. 1) support diamonds or other types of highly temperature- and wear-resistant tools which can remove large quantities of material within short intervals of time. In most instances, the machine tool of our invention can be used for rough as well as precision treatment of workpieces including such precision treatment which is presently performed by specially designed machines. For example, the machine tool can be used for rough and final machining of pistons for internal combustion engines (at the present time, such pistons are subjected to preliminary treatment in a conventional multiple spindle automatic and are thereupon finished in special machine tools). The improved machine can utilize diamond tipped tools which complete the treatment of pistons at elevated cutting speeds.

The lubricating system for the machine tool is shown in FIG. 2. Such lubricating system is designed to furnish oil or other lubricant to the front and rear bearings of the bearing assemblies for the spindles 11. The rear end portion of the spindle carrier 12 is received in a bearing sleeve 48 which is provided with an internal annular groove 46 receiving lubricant from a suitable source (tank T) by way of bores 50 (only one shown) machined into the sleeve 48. The carrier 12 is provided with radial bores 51 which register with the internal groove 46 and communicate with compartments for the rear bearings 14, 141. The front portion of the carrier 12 is received in a second bearing sleeve 49 having an internal annular groove 47 which receives lubricant from the tank T by way of bores 52 and furnishes lubricant to the compartments for the front bearings 13, 131 by way of radial bores 53 in the carrier. It is preferred to provide two separate paths for delivery of fresh lubricant to the front and rear bearings for spindles 11. However, the spent lubricant is preferably returned into a common external annular groove or channel 54 which is machined into the carrier 12 and is surrounded by the rear bearing sleeve 48. This groove 54 receives lubricant from the front and rear compartments. Such mode of collecting spent lubricant is possible when the carrier 12 extends all the way between the front and rear bearings. Of course, if the machine tool utilizes a spindle carrier which comprises two discrete portions, one for the front bearings for spindles 11 and the other for the rear bearings, the lubricant for the front bearings will be fed and withdrawn independently of the feeding and withdrawal of lubricant for the rear bearings. A two-piece spindle carrier is often desirable to reduce the moment of inertia of the moving mass. However, the illustrated spindle carrier is less expensive and the sealing of lubricant is simpler.

To insure uniform flow of lubricant in all regions of the internal grooves 46, 47 of the bearing sleeves 48 and 49 (the oil pressure in the lowermost portions of these grooves is normally higher), the return pipe 58 which receives spent lubricant from the groove 54 of the carrier 12 preferably accommodates an adjustable flow restrictor 55 which regulates the return flow of lubricant into the tank T. The flow restrictor 55 is adjusted in such a way that it insures uniform flow of lubricant to all of the compartments in the carrier 12. The supply pipes 59 (only one shown in FIG. 2) which deliver fresh lubricant to the bores 50 and 52 of the bearing sleeves 48, 49 preferably also contain adjustable flow restrictors 56 located downstream of a variable delivery pump 57 which delivers lubricant to the grooves 46 and 47. Thus, the quantity of circulated lubricant can be regulated by changing the delivery rate of the pump 57 and/or by adjusting the flow restrictors 56. The regulation of lubricant flow through the front and rear bearings for the spindles 11 is important because such lubricant normally also serves to cool the bearings. If the rotational speed of the spindles 11 is to be increased when the machine tool is set up to perform a different series of operations, the rate of lubricant circulation is increased to account for increased generation of heat.

The flow restrictor 55 can be omitted if the median portions of internal grooves 46, 47 in the bearing sleeves 48, 49 (approximately at the level of the spindle carrier axis) accommodate pairs of suitable flow dividers (not shown) which divide the columns of lubricant in such grooves to insure uniform flow of lubricant to all of the compartments. The grooves 46, 47 may be circumferentially complete or each thereof may comprise several discrete annular sections.

Referring again to FIG. 2, it will be seen that each bore 39 of the cylinder 25 is coplanar with a bore 36 and with the axis of the cylinder 25.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a multiple spindle machine tool, a combination comprising frame means; a spindle carrier indexible in said frame means; a plurality of work spindles rotatably mounted in said carrier; and hydrodynamic bearing means of high static and dynamic rigidity for said spindles, said bearing means comprising bearings installed in said carrier and surrounding said spindles, biasing means for urging said bearing against the respective spindles, and hydraulically operated control means for adjusting the pressure between at least some of said bearings and the respective spindles, said control means comprising distributor means including a cylinder coaxially secured to said carrier and a fixed distributor member in said cylinder, said carrier having a cylinder chamber for each of said spindles and said control means further comprising pistons located in said cylinder chambers and movable in response to admission of pressurized hydraulic fluid into the respective chambers to thereby relieve the pressure between the corresponding spindles and the respective bearings, said distributor member having discrete fluid admitting and fluid evacuating passages and said cylinder having bores communicating with said chambers and with selected passages of said distributor member.

2. A combination as defined in claim 1, wherein said control means further comprises a supply conduit for pressurized fluid, a return conduit for spent fluid, and valve means for connecting selected conduits with selected passages of said distributor member.

3. A combination as defined in claim 1, wherein said distributor member comprises first channel means communicating with said fluid admitting passage and second channel means communicating with said fluid evacuating passage, said first and second channel means being located in first and second planes spaced from each other in axial direction of said cylinder and said bores including first and second bores respectively communicating with said first and second channel means.

4. A combination as defined in claim 3, wherein said first and second bores are respectively located in said first and second planes, there being one first and one second bore for each of said spindles and each first bore being located in a common plane with a second bore and with the axis of said cylinder.

5. A combination as defined in claim 3, wherein each of said first and second channel means comprises a portion provided in the periphery and extending circumferentially of said distributor member.

6. In a multiple spindle machine tool, a combination comprising frame means; a spindle carrier indexible in said frame means; a plurality of work spindles rotatably mounted in said carrier; hydrodynamic bearing means of high static and dynamic rigidity for said spindles, said bearing means comprising bearings installed in said carrier and surrounding said spindles, biasing means for urging said bearings against the respective spindles, and hydraulically operated control means for adjusting the pressure between at least some of said bearings and the respective spindles, said control means comprising distributor means including a cylinder coaxially secured to said carrier and a fixed distributor member in said cylinder; an indexing member secured to said carrier; and holder means securing said cylinder to said indexing member.

7. In a multiple spindle machine tool, a combination comprising frame means; a spindle carrier indexible in said frame means; a plurality of work spindles rotatably mounted in said carrier; hydrodynamic bearing means of high static and dynamic rigidity for said spindles, said bearing means comprising bearings installed in said carrier and surrounding said spindles, biasing means for urging said bearings against the respective spindles, and hydraulically operated control means for adjusting the pressure between at least some of said bearings and the respective spindles, said control means comprising distributor means including a cylinder coaxially secured to said carrier and a fixed distributor member in said cylinder; and a supporting member for said distributor member, said supporting member being movable in said frame means about the axis of said distributor member.

8. In a multiple spindle machine tool, a combination comprising frame means; a spindle carrier indexible in said frame means; a plurality of work spindles rotatably mounted in said carrier; hydrodynamic bearing means of high static and dynamic rigidity for said spindles, said bearing means comprising bearings installed in said carrier and surrounding said spindles, biasing means for urging said bearings against the respective spindles, and hydraulically operated control means for adjusting the pressure between at least some of said bearings and the respective spindles, said bearings including races movable axially of said spindles and said biasing means comprising springs arranged to urge said races in the axial direction of the respective spindles; and adjusting means for regulating the bias of said springs.

9. A combination as defined in claim 8, wherein said springs are prestressed dished springs surrounding the respective spindles and said adjusting means comprises first threaded rings mounted in said carrier and each surrounding one of said spindles and second threaded rings each meshing with one of said first rings and rotatable about the axis of the respective spindle to thereby change the bias of the respective spring.

10. A combination as defined in claim 9, wherein said carrier is provided with slots affording access to said second rings and further comprising cover means separably secured to said carrier to normally conceal said slots.

11. A combination as defined in claim 10, wherein said second rings have bores and said cover means comprises projections extending into said bores to hold said second rings against rotation with reference to said first rings.

12. In a multiple spindle machine tool, a combination comprising frame means; a spindle carrier indexible in said frame, said carrier having an external surface, a plurality of compartments and bores extending from said surface to said compartments; at least one stationary bearing sleeve having an internal surface adjacent to said external surface, one of said surfaces having a circumferential groove communicating with said bores; means for feeding a lubricant into said groove; a plurality of work spindles rotatably mounted in said carrier; and hydrodynamic bearing means of high static and dynamic rigidity for said spindles, said bearing means comprising bearings installed in said compartments and surrounding said spindles, biasing means for urging said bearings against the respective spindles, and hydraulically operated control means for adjusting the pressure between at least some of said bearings and the respective spindles.

13. A combination as defined in claim 12, wherein said means for feeding lubricant comprises supply pipe means and flow restrictor means in said pipe means.

14. A combination as defined in claim 12, further comprising return pipe means receiving lubricant from said compartments and flow restrictor means in said return pipe means.

15. A combination as defined in claim 12, further comprising flow divider means provided in said groove, said flow divider means being located at the general level of the axis of said carrier.

* * * * *